C. HINMAN.
POTATO PLANTER.
APPLICATION FILED JULY 26, 1909.
958,922.
Patented May 24, 1910.
2 SHEETS—SHEET 2.
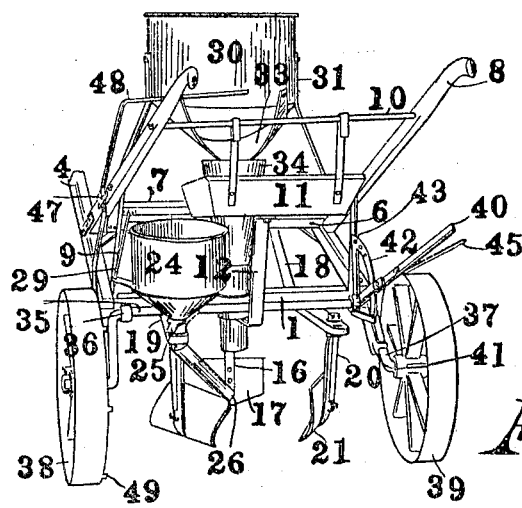
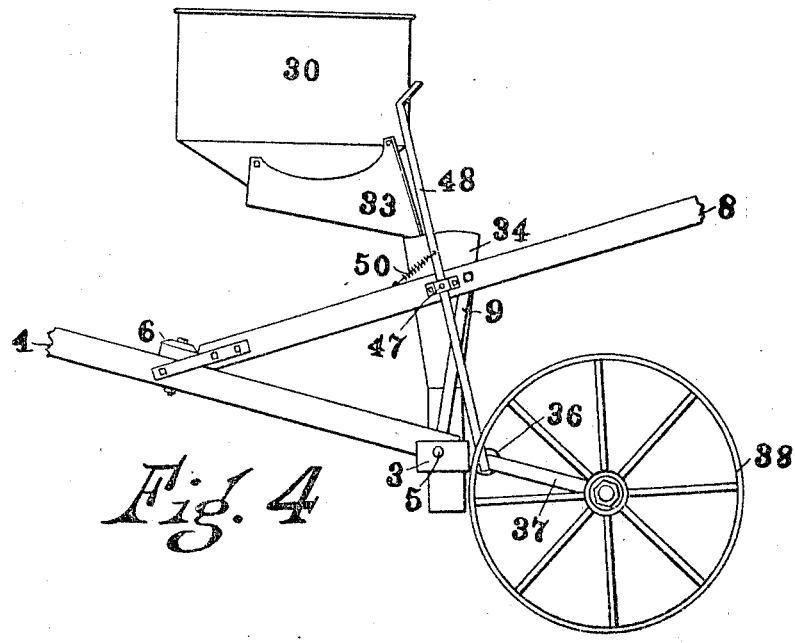
Witnesses:
Austin B. Hanscom
Glenara Fox
INVENTOR—
Curtis Hinman,
By C. E. Humphrey
ATTORNEY.

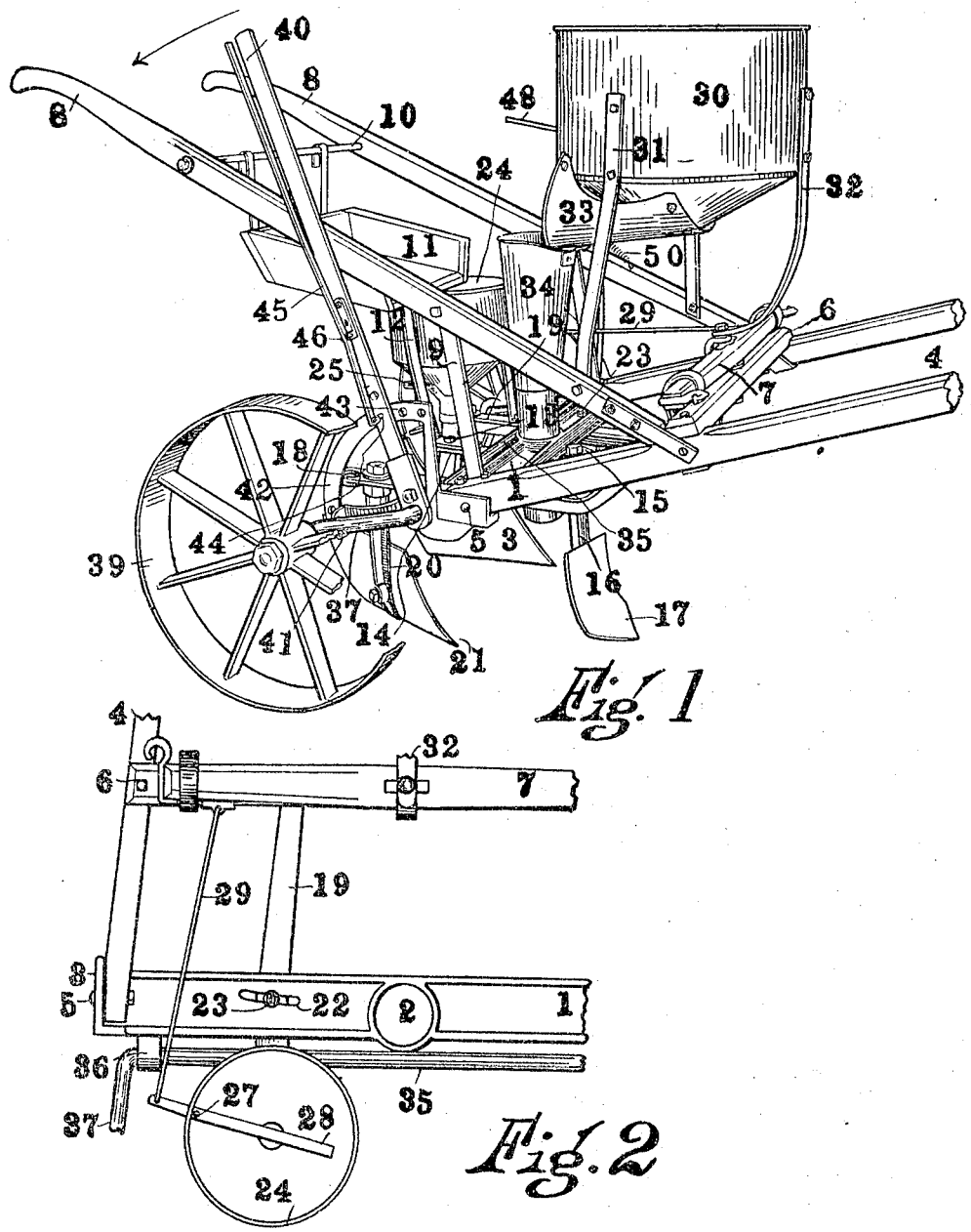

UNITED STATES PATENT OFFICE.

CURTIS HINMAN, OF AKRON, OHIO.

POTATO-PLANTER.

958,922.   Specification of Letters Patent.   Patented May 24, 1910.

Application filed July 26, 1909.   Serial No. 509,608.

*To all whom it may concern:*

Be it known that I, CURTIS HINMAN, a citizen of the United States, residing at Akron, in the county of Summit and State of Ohio, have invented new and useful Improvements in Potato-Planters, of which the following is a specification.

This invention relates to combined potato planters and fertilizer distributers.

The object of this invention is to provide a machine embodying suitable mechanism adapted to form a furrow in which to drop the seed potatoes at predetermined intervals, to deposit suitable fertilizer in the furrow and afterward fill the same with earth, thereby covering the seed potatoes and fertilizer.

The invention further contemplates providing means whereby the mechanism for performing the foregoing operations may be raised from contact with the ground, thus making the device freely movable from place to place.

A further object of the invention is to provide a hopper for a fertilizer having novel means for constantly agitating the fertilizer to insure constant feeding of the same into the furrow.

The invention further contemplates the feeding of the seed potatoes from the hopper or reservoir in which they are stored to the feed spout by hand and in order to accurately time the feed of the seed potatoes into the feed-spout and suitably space the potatoes apart, mechanism is employed for signaling to the operator when the seed potatoes are to be transferred from the reservoir to the feed-spout.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures: Figure 1 is a perspective view of my improved potato planter and fertilizer distributer. Fig. 2 is a detailed view of the fertilizer, hopper and the agitator therefor. Fig. 3 is a perspective view of the device shown in Fig. 1 looking from the rear thereof; and, Fig. 4 is a detailed view of the timing mechanism used for indicating to the operator the proper times for transferring the potatoes from the hopper to the feed spout.

The frame of the device comprises a cross bar 1, preferably constructed of metal provided with a central aperture 2 and having flanged ends 3 to which are pivoted thills 4 by means of bolts or pins 5. Mounted on a suitable cross bar 6 extending between the thills 4 is a whiffletree 7. Extending upwardly from each of the thills 4 is an operating handle 8 supported by a brace 9 connected near the rear end of each of the thills 4. Extending between the operating handles 8 is a cross bar 10 from which is suspended a seat 11, the front portion of which is sustained by a supporting member 12 secured by means of a bolt 13 to an arm 14 extending rearwardly from the cross bar 1.

The cross bar 1 is provided with a forwardly-extending boss 15 to which is secured a depending standard 16 bearing on its lower end a plow 17 which forms the furrow into which the seed potatoes are deposited.

Pivotally-secured to the under side of the cross bar 6 are two longitudinally-extending beams 18 and 19 each provided with a recess or socket in its rear end and each further provided with one or more openings in which are secured shovel standards 20 to the lower ends of which are secured shovels 21 adapted to close the furrow formed by the plow 17. The beams 18 and 19 pass under and bear against the lower face of the cross bar 1, the latter being provided with slots 22 (see Fig. 2) through which extend bolts 23 also extending through the beams 18 and 19 for adjustably holding the latter in a predetermined position, yet permitting the beams to be swung toward or away from each other by unloosening the bolts 23 and when a desired position is attained they are fixedly secured through the medium of these bolts.

Mounted in the recess or socket in the rear end of the beam 19 is a hopper 24 for holding fertilizer, the lower end of which is provided with a gate 25 to arrest the escape of the fertilizer when desired.

Secured to the under side of the beam 19 and communicating with the recess in which is mounted the hopper 24 is a spout 26 adapted to conduct the fertilizer to the furrow formed by the plow 17. Pivotally-mounted at 27 in the hopper 24 is an agitator 28 the outer end of which is connected by a rod 29 to the whiffletree 7, so that when the latter is oscillated by the movement of the horse in drawing the machine, the agitator is constantly kept in motion to agitate the fertilizer to cause it to feed through the spout 26 into the furrow.

The hopper 30 which is used for containing the seed potatoes is sustained by two supports 31 attached to the operating handles 8 and a brace 32 connected with the bolt which forms the pivot for the whiffletree 7. The hopper 30 is provided with an opening (not shown) through which the seed potatoes pass to an apron 33 which is relatively wide and flat and has a very slight inclination rearwardly to receive the seed potatoes from the opening in the hopper and conduct them to the feed chute 34 which is mounted in the aperture 2 of the cross bar 1 so as to deliver the seed potatoes to the furrow immediately in the rear of the plow 17.

The device is supported upon a non-rotating axle embodying a medial portion 35 mounted in bearings 36 projecting rearwardly from the cross bar 1. Both ends of the axle are provided with crank-shaped portions 37 on one of which is mounted a ground wheel 38 and on the other a similar wheel 39. This axle is made in the form of a crank-shaft to permit the device to be raised from contact with the ground when being conveyed from place to place and to be lowered so as to bring the plow and shovels into engagement with the ground during the operation of planting potatoes.

The device is raised and lowered by the following mechanism: Mounted on the medial portion 35 of the axle is a lever 40 having an extended arm 41 which engages the crank-shaped portion 37 so that when the lever 40 is moved in the direction of the arrow the medial portion 35 of the axle, together with the frame of the device will be raised from contact with the ground. Secured to the cross bar 1 is a segment-shaped member 42 provided with apertures 43 to receive a pin 44 mounted on a locking lever 45 pivoted at 46 on the lever 40. The pin 44 engaging in the apertures 43 serves to lock the lever 40 from movement so that when the same is moved rearwardly in the direction of the arrow and the pin 44 inserted in a suitable aperture the device will be raised from the ground and maintained in this position through the locking function of the pin 44.

Pivotally-mounted at 47 on one of the operating handles 8 is an oscillating lever 48 the lower end of which is adjacent to the ground wheel 38 which is provided on its inner face with a plurality of lugs 49 which successively engage the lower end of the lever 48 and move it forward thereby moving the upper end rearwardly away from the hopper 30. As soon as the lever has passed from engagement with each of the lugs 49 a spring 50 swings the upper end of the lever 48 forward with sufficient force to strike against the side of the hopper 30, thereby signaling to the operator the times when the seed potatoes are to be fed from the hopper 30 to the chute 34.

The invention contemplates in the operation of this device that an operator will be seated on the seat 11 and will manually feed the potatoes from the apron 33 into the chute 34 at each successive stroke of the lever 48 against the side of the hopper 30 and another operator will drive the horse and guide the device through the medium of the operating handles 8.

It will of course be obvious that the position of the shovels 21 will be arranged so as to effectually cover the furrow produced by the plow 17 after the potatoes have been dropped into the furrow and the fertilizer from the hopper 24 deposited therein.

The movement of the horse in pulling the device causes an oscillating movement of the whiffletree which causes agitation of the contents of the hopper and when not in use the feed of the fertilizer from the hopper 24 to the chute may be arrested through the medium of the gate 25.

What I claim and desire to secure by Letters Patent, is:—

1. In a combined potato-planter and fertilizer distributer, the combination of a frame provided with means to permit the device to be drawn by an animal, a pair of rearwardly-extending operating handles suitably-supported by said frame and constituting means for directing the course of said device when in use, a seat for an operator carried by said operating handles, a hopper for seed potatoes arranged in advance of said seat and supported by said frame, a chute adapted to conduct potatoes from said hopper, a plow for producing a furrow in advance of said chute, a hopper for fertilizer arranged rearwardly of said chute and adapted to deliver fertilizer to said furrow, a plow for closing said furrow, a non-rotating crank-shaped axle carried by said frame, ground wheels mounted on the outer ends thereof, a lever secured to the offset portion of said axle for shifting the position of the same and thereby raising and lowering said frame and means for locking said axle in a selected position.

2. In a combined potato-planter and fertilizer distributer, the combination of a frame, a non-rotating crank-shaped axle carried by said frame, ground wheels mounted on the outer end of the latter, a lever for shifting the position of said axle for raising and lowering said frame, a hopper for seed potatoes mounted on said frame, an apron sustained by said hopper below the outlet thereof and inclined slightly rearwardly to receive the flow of said potatoes from said hopper, a chute to receive said potatoes from said apron carried by said frame, a plow for producing a furrow in advance of said chute, a hopper for fertilizer arranged rearwardly of said chute and provided with an outlet directed to discharge the contents of said hopper into said furrow, an intermittingly-operated agitator for said fertilizer arranged in said hopper and a plow for closing said furrow disposed rearwardly of said fertilizer hopper.

3. In a combined potato-planter and fertilizer distributer, the combination of a frame provided with draft mechanism, an axle carried by said frame, ground wheels mounted on said axle, a plow for producing a furrow mounted on said frame, mechanism for feeding potatoes to said furrow, a hopper arranged to deposit fertilizer in said furrow, an intermittingly-operated agitator in said fertilizer hopper for insuring the feed of said fertilizer to said furrow and a shovel to close said furrow.

4. A combined potato planter and fertilizer distributer comprising a frame embodying a whiffletree oscillated by the movement of an animal in drawing the device, an axle carried by said frame, wheels mounted on said axle, a plow for producing a furrow mounted on said frame, mechanism for feeding potatoes to said furrow, a hopper for fertilizer mounted on said frame arranged to deposit fertilizer in said furrow, an agitator in said hopper connected with said whiffletree whereby the movement thereof produces intermittent agitation of the fertilizer in said hopper, and shovels for closing said furrow.

In testimony whereof I have hereunto set my hand in presence of two subscribing witnesses.

CURTIS HINMAN.

Witnesses:
C. E. HUMPHREY,
GLENARA FOX.